(12) United States Patent
Cai et al.

(10) Patent No.: US 11,101,852 B2
(45) Date of Patent: Aug. 24, 2021

(54) CHANNEL STATE INFORMATION FEEDBACK METHOD AND DEVICE

(71) Applicant: ZTE CORPORATION, Shenzhen (CN)

(72) Inventors: Jianxing Cai, Shenzhen (CN); Zhaohua Lu, Shenzhen (CN); Yu Ngok Li, Shenzhen (CN); Yijian Chen, Shenzhen (CN); Huahua Xiao, Shenzhen (CN); Hao Wu, Shenzhen (CN); Yong Li, Shenzhen (CN); Yuxin Wang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 85 days.

(21) Appl. No.: 16/324,808

(22) PCT Filed: Jul. 25, 2017

(86) PCT No.: PCT/CN2017/094375
§ 371 (c)(1),
(2) Date: May 6, 2019

(87) PCT Pub. No.: WO2018/028429
PCT Pub. Date: Feb. 15, 2018

(65) Prior Publication Data
US 2019/0260430 A1    Aug. 22, 2019

(30) Foreign Application Priority Data

Aug. 12, 2016  (CN) .......................... 201610670311.8

(51) Int. Cl.
*H04B 7/0417* (2017.01)
*H04B 7/0456* (2017.01)
(Continued)

(52) U.S. Cl.
CPC ............ *H04B 7/0417* (2013.01); *H04B 7/04* (2013.01); *H04B 7/0456* (2013.01); *H04L 5/0048* (2013.01); *H04W 24/10* (2013.01)

(58) Field of Classification Search
CPC ...... H04B 7/0417; H04B 7/04; H04B 7/0456; H04B 7/0626; H04L 5/0048; H04L 5/0057; H04L 1/0026; H04W 24/10
See application file for complete search history.

(56) References Cited

U.S. PATENT DOCUMENTS 9,401,752 B2 *   7/2016  Chen ................... H04B 7/0619
9,544,031 B2 *   1/2017  Huo .................... H04B 7/0452
(Continued)

FOREIGN PATENT DOCUMENTS

CN          102377469 A       3/2012
CN          102412939 A       4/2012

*Primary Examiner* — Nishant Divecha
(74) *Attorney, Agent, or Firm* — Li & Cai Intellectual Property (USA) Office

(57) ABSTRACT

The present invention provides a channel state information feedback method and device. The method includes: selecting, by a communication node, N information groups from configured M information groups; where N and M are positive integers, and N is less than or equal to M; processing, by the communication node, the selected N information groups in a preset manner to obtain index information of the N information groups and parameter information of the preset manner, wherein the index information comprises group indices of the N information groups or index of information in the N information groups; and feeding back, by the communication node, the index information and the parameter information.

16 Claims, 2 Drawing Sheets

(51) Int. Cl.
*H04L 5/00* (2006.01)
*H04W 24/10* (2009.01)
*H04B 7/04* (2017.01)

(56) References Cited

U.S. PATENT DOCUMENTS

| | | | | |
|---|---|---|---|---|
| 9,654,195 | B2* | 5/2017 | Rahman | H04B 7/0617 |
| 9,967,012 | B2* | 5/2018 | Onggosanusi | H04B 7/0626 |
| 10,270,504 | B2* | 4/2019 | Park | H04B 7/0626 |
| 10,333,687 | B2* | 6/2019 | Wang | H04L 5/16 |
| 10,505,694 | B2* | 12/2019 | Liu | H04W 24/10 |
| 10,594,373 | B2* | 3/2020 | Muruganathan | H04B 7/0639 |
| 2010/0239037 | A1* | 9/2010 | Tang | H04B 7/0639 375/260 |
| 2013/0202057 | A1* | 8/2013 | Chen | H04L 25/03898 375/267 |
| 2013/0208819 | A1* | 8/2013 | Chen | H03M 7/3088 375/267 |

* cited by examiner

CHANNEL STATE INFORMATION FEEDBACK METHOD AND DEVICE

CROSS-REFERENCE TO RELATED APPLICATION

This application is based upon and claims priority to PCT Application No. PCT/CN2017/094375 filed Jul. 25, 2017, which is based upon and claims priority to Chinese Patent Application No. 201610670311.8, filed Aug. 12, 2016, the entire contents of which are incorporated herein by reference.

TECHNICAL FIELD

The present disclosure relates to the field of communication, and more particularly to a method and a device for feeding back channel state information.

BACKGROUND

In a wireless communication system, a transmitting end and a receiving end generally use multiple antennas to transmit and receive data to obtain a high rate. One principle of Multiple Input Multiple Output (MIMO) technology is to use some characteristics of a channel to form a multi-layer transmission that matches channel characteristics, thereby effectively improving system performance. Since significant performance improvement can be achieved without increased bandwidth and power, it is a very promising technology that is widely used in current systems. For example, in a Long Term Evolution (LTE) system and an enhanced version of LTE (Long Term Evolution-Advanced, LTE A) system, there are multiple modes of multi-antenna transmission, such as transmission mode 2 to transmission mode 10. There are many concepts and techniques involved in the multi-antenna technology. To help understand and facilitate the description of the present disclosure, the concepts of some key technologies will be introduced below.

In general, the channel state information (CSI) has two feedback modes, namely, periodic feedback and aperiodic feedback. For example, in the LTE/LTE-A system, the physical uplink control channel (PUDCCH) is utilized to perform periodic feedback and a physical uplink shared channel (PUSCH) is utilized to perform aperiodic feedback. There are two main methods for the feedback of the terminal CSI: the base station can configure the terminal to measure and quantize the channel information, and the quantized channel state information (CSI) is fed back periodically through the PUCCH, the CSI including a rank indicator (RI)/Precoding Matrix Indicator (PMI)/Channel Quality Indication (CQI). The base station can also abruptly trigger the terminal to perform CSI information (including RI/PMI/CQI) reporting when needed, mainly through the PUSCH, in order to overcome problems that the real-time performance is not high enough, and the accuracy of the CSI quantization is limited by the control channel overhead.

The basic principle of codebook-based channel information quantization feedback is briefly described as follows. Assuming that a limited feedback channel capacity is B bps/Hz, then the number of available codewords is $N=2^B$, and the feature vector space of the channel matrix is quantized to form a codebook space $\mathfrak{R} = \{F_1, F_2 \ldots F_N\}$. The transmitting end and the receiving end both save or generate the codebook (which is the same for the transmitting end and the receiving end) in real time. According to the channel matrix H obtained by the receiving end, the receiving end selects a codeword $\mathfrak{R}$ that best matches the channel according to a certain criterion, and feeds back the serial number of the codeword i (that is, PMI) back to the transmitting end. The transmitting end searches out the corresponding precoding codeword $\hat{F}$ according to the sequence number i, thereby obtaining channel information, where $\hat{F}$ represents the feature vector information of the channel.

The principle of codeword construction in the LTE system is introduced as follows. The LTE codebook is also evolving with the evolution of the standard version. In Release 8 and Release 9, the codebook of 4 antennas and the codebook of 2 antennas are all in the form of single codeword, with only one PMI having its value represented as i=1, ..., N11, N11 indicating the number of codewords. In the 8-antenna codebook of Release 10 and the 4-antenna codebook of Release 12, it is the form of double-codebook feedback, that is, the codeword can be written in the form of W=W1*W2, where W1 is a long-term feedback codebook called the first codebook; W2 represents a short-term feedback codebook called the second codebook, which is used to select one of the M1 candidate beams in the W1 codeword and to select a polarization phase for a beam selected for every polarization direction in the same data layer (Co-phasing). Each codeword in W2 is quantized and fed back by PMI2, and its value is i2=1, ..., M1, where M1 is the number of W2. For details, please refer to LTE Release10 protocol.

The codewords before Release 12 are designed for 1D antenna arrays and belong to 1D codewords. In the design of Release 13 codebook, the dimension of the codebook becomes larger due to the utilization of more antennas. The topology of the antenna is also generally planar, that is, the antenna with two dimensions is designed with a 2D codeword, where N1 and N2 represent the number of first dimension ports and the number of second dimension ports, respectively. Thus, each beam in the first codebook W1 is represented in a two-dimensional form $v_m \otimes u_n$, where $v_m$ and $u_n$ denote the discrete Fourier transform (DFT) of the first dimension and the second dimension, respectively, $v_m \otimes u_n$ represents the kronecker product of $v_m$ and $u_n$, and m=1, 2, ..., $B_1$, n=1, 2, ... $B_2$. The number of ports in the first dimension is N1, and the number of ports in the second dimension is N2. The DFT corresponding to the first dimension port is oversampled by O1 times, and the DFT corresponding to the port of the second dimension is oversampled by O2 times. The number of discrete Fourier vectors of the first dimension or the second dimension antenna is a multiple of the oversampling factor of the number of ports, so B1=N1*O1, B2=N2*O2, where O1 is the first dimension oversampling factor, and O2 is the second dimension oversampling factor. The first dimension codebook of the first codebook is represented by PMI11, and its value is i11= 1, ..., N11, and the codebook of the second dimension of the first codebook is represented by PMI12, and its value is i12=1, ..., N12. For each of the above indexes of PMI11 and PMI12, there are M1 W2 codewords, and each W2 codeword is used for selecting a 2-dimensional beam $v_m \otimes u_n$ from W1 and Co-phasing for different polarization directions, and the corresponding codeword index is PMI2, expressed by i2=1, ..., M1.

Without loss of generality, the codeword for the first dimension port number N11=1 or the second dimension port number N12=1 is referred to as a 1D codeword, and the codeword for the first dimension port number N11>1 and the second dimension port number N12>1 is referred to as a 2D codeword. If it is a 1D codeword and in the single codeword structure, it is represented by PMI or i. If it is a 1D codeword and in the double-codeword structure, it is represented by PMI1 and PMI2 jointly, and the index is jointly represented by i1/i2. If it is a 2D codeword, it is represented by three codebook indexes PMI11, PMI12, and PMI2 jointly or represented by indexes i11, i12, and i2 jointly.

In the LTE-A system, there are two types of channel information measurement and feedback: channel state information feedback type A (Class A) and channel state information feedback type B (Class B) respectively.

Class A: The base station transmits a CSI-RS, which is generally a non-precoding pilot. The UE directly performs channel measurement and CSI quantization based on the CSI-RS to obtain RI/PMI/CQI. These contents are fed back on the PUCCH or PUSCH.

Class B: The base station transmits a CSI-RS, which is generally a non-precoding pilot. The UE may need to select the precoding pilot first, or select the resource set of the precoding pilot, or select the port group. Then, based on the selected subset, channel information is quantized and fed back, including subset selection information, and RI/PMI/CQI information corresponding to the selected subset of CSI-RS measurement resource. The feedback Class B is further divided into Class B K=1 and Class B K>1. For Class BK=1, the base station configures a set of CSI-RS resources, including X precoding CSI-RS ports. Each precoding CSI-RS port pair can be configured with different beam directions. The terminal can calculate CSI information of X precoding CSI-RS ports based on Release 12 codewords, can also calculate CSI-RS information based on the W2 codebook of Release 13. Finally, the terminal feedbacks $i_2$ to indicate the selected precoding CSI-RS port. For Class B K>1, the base station is configured with K sets of CSI-RS resources, each set of CSI-RS resources has $N_k$ CSI-RS ports and the $N_k$ CSI-RS ports correspond to the same beam direction. Different CSI-RS resources correspond to different beam directions. The terminal reports CSI-RS Resource Indicator (CRI) in the CSI report to indicate the best pre-coded CSI-RS port.

It can be seen that, in the procedure of communication, the terminal may select the best codeword from the codebook according to the channel state information and the codeword information is fed back to the base station; or the base station pre-codes the CSI-RS port according to the channel state information, and the terminal only has to select the best precoding CSI-RS port and feed back the port information or the corresponding CSI-RS resource indication information to the base station. Therefore, in fact, we can collectively refer to codeword information, CSI-RS port information, and CSI-RS resource information as precoding information. Such precoding information all reflect the channel state to some extent, and the base station and the terminal can utilize such precoding information to improve the performance of the system. It should be noted that the terminal and the base station may be collectively referred to as communication nodes.

However, in the current system, the precoding matrix or the selected beam is fed back based on the strongest path information in the channel, which causes the feedback or the configured information to not match the channel well, thereby affecting the performance of the system.

There is currently no effective solution to the above problems in the related art.

SUMMARY

The embodiments of the present disclosure provide a method and a device for feeding back channel state information, so as to at least solve the problem in the related art that a precoding matrix or a selected beam are fed back based on the strongest path information in the channel.

According to an aspect of the embodiments of the present disclosure, a method for feeding back channel state information is provided, including: selecting, by a communication node, N information groups from configured M information groups; where N and M are positive integers, and N is less than or equal to M; processing, by the communication node, the selected N information groups in a preset manner to obtain index information of the N information groups and parameter information of the preset manner, wherein the index information includes group indices of the N information groups or index of information in the N information groups; and feeding back, by the communication node, the index information and the parameter information.

According to another aspect of the embodiments of the present disclosure, there is provided a device for feeding back channel state information, which is applied to a communication node side, including: a selection module configured to select N information groups from configured M information groups; where N and M are positive integers, and N is less than or equal to M; a processing module configured to process the selected N information groups in a preset manner to obtain index information of the N information groups and parameter information of the preset manner, where the index information includes group indices of the N information groups or index of information in the N information groups; and a feedback module configured to feed back the index information and the parameter information.

With the embodiments of the present disclosure, a communication node may feed back to other communication nodes the group indices of a plurality of selected information groups or indices of the information in the plurality of information groups, and parameter information of the reset manner for processing the information groups. That is, the communication node can process the plurality of information groups in the channel, not only limited to the information group having the strongest path information. Therefore, the present disclosure can solve the problem in the related art that a precoding matrix or a selected beam are fed back based on the strongest path information in the channel, and can achieve an effect of improving resource utilization.

BRIEF DESCRIPTION OF THE DRAWINGS

The drawings described herein are intended to provide a further understanding of the present disclosure, and are intended to be a part of the present application. The illustrative embodiments of the present disclosure and the description thereof are used for explaining the present disclosure and do not constitute an undue limitation of the present disclosure. In the drawings.

DETAILED DESCRIPTION

The present disclosure will be described in detail below with reference to the drawings in conjunction with the embodiments. It should be noted that the embodiments in the present application and the features in the embodiments may be combined with each other without conflict.

It is to be understood that the terms "first", "second", and the like in the specification and claims of the present disclosure are used to distinguish similar objects, and are not necessarily used to describe a particular order or sequence.

First Embodiment

Figure 1:
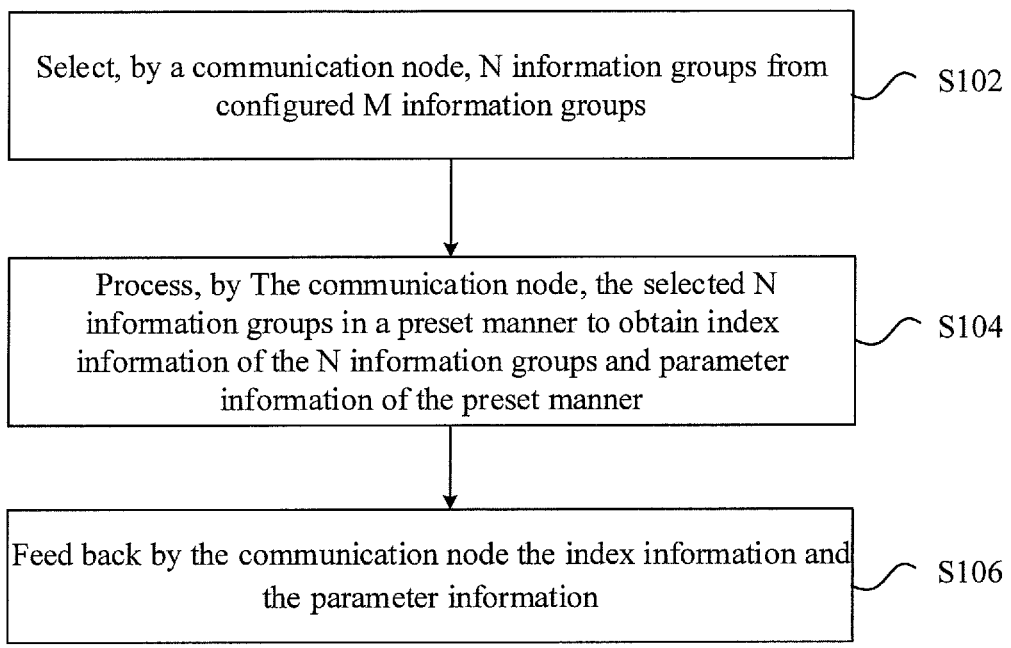
FIG. 1 is a flowchart of a method for feeding back channel state information according to an embodiment of the present disclosure.

The present embodiment provides a method for feeding back channel state information. FIG. 1 is a flowchart of a method for feeding back channel state information according to an embodiment of the present disclosure. As shown in FIG. 1, the method includes the following steps.

In Step S102, a communication node selects N information groups from configured M information groups; wherein N and M are positive integers, and N is less than or equal to M.

In Step S104, the communication node processes the selected N information groups in a preset manner to obtain index information of the N information groups and parameter information of the preset manner. The index information includes: group indices of the N information groups or index of information in the N information groups.

In Step S106, the communication node feeds back the index information and the parameter information.

Through the above steps S102 to S106 of the embodiment, a communication node may feed back to other communication nodes group indices of a plurality of selected information groups or indices of the information in the plurality of information groups, and parameter information of the reset manner for processing the information groups. That is, the communication node can process the plurality of information groups in the channel, not only limited to the information group having the strongest path information. Therefore, it can solve the problem in the related art that a precoding matrix or a selected beam are fed back based on the strongest path information in the channel, and can achieve an effect of improving resource utilization.

In an optional implementation of this embodiment, the communication node includes a first communication node and a second communication node, wherein the first communication node and the second communication node have data interaction with each other. In a specific application, the first communication node and the second communication information node are preferably base stations or terminals. However, in other specific application scenarios, the first communication node and the second communication node may also be other network elements.

Based on this, the communication node feeding back the index information and the parameter information to other communication node that interacts with the communication node in step S106 in this embodiment may be the following steps.

In Step S106-1, the first communication node feeds back the index information and the parameter information to a second communication node.

In Step S106-2, the second communication node feeds back the index information and the parameter information to the first communication node.

It can be seen that, in the above steps S106-1 and S106-2, the first communication node may be a base station, the second communication node is a terminal; or, the first communication node is a terminal, and the first communication node is a base station. However, other network elements are also possible.

It should be noted that the information group involved in this embodiment includes: a codeword group and a measurement resource group; wherein the codeword group is formed by codewords in a codebook, and the measurement resource group includes: a measurement pilot port group, and a measurement pilot resource group.

Based on the foregoing description of the information group and the communication node, the communication node configuring the M information groups in this embodiment may be: the communication node configuring M information groups with configuration information.

The present embodiment will be described in detail below with reference to an optional implementation of this embodiment.

First Optional Implementation

When the information group is a codeword group, the communication node configuring M information groups with configuration information in this embodiment includes the following steps.

In Step S11, the first communication node acquires a first dimension index i11 in a first codebook and a second dimension index i12 in the first codebook.

In Step S21, the first communication node constructs the first dimension index of a codeword in each codeword group in the first codebook as i11+Xj, and the second dimension index of a codeword in each codeword group in the first codebook as i12+Yj, where i11, i12, Xj and Yj are integers.

Second Optional Implementation

When the information group is a codeword group, the codewords in the codeword group configured with the configuration information are orthogonal to each other. Based on this, the communication node configuring the M information groups with configuration information may include the following steps.

In Step S21, the first communication node acquires a first dimension index i11 in a first codebook and a second dimension index i12 in the first codebook.

In Step S22, the first communication node constructs the first dimension index of a codeword in each codeword group in the first codebook as i11+p*O1, and the second dimension index of a codeword in each codeword group in the first codebook as i12+q*O2, where p and q are integers, and O1 and O2 are oversampling factors of the first dimension and the second dimension, respectively.

Third Optional Implementation

When the information group is a measurement resource group, the communication node configuring the M information groups with configuration information in this embodiment includes the following steps.

In Step S31, the second communication node acquires a first dimension index i11 in a first codebook and a second dimension index i12 in the first codebook.

In Step S32, the second communication node and the first communication node pre-arrange (or pre-agree) the first dimension index of the precoding codeword in the first codebook used by the measurement resource group to be i11+p*O1, and the second dimension index in the first codebook to be i12+q*O2, where p and q are integers, and O1 and O2 are oversampling factors of the first dimension and the second dimension, respectively.

It should be noted that the values of the integers Xj, Yj, p, q involved in the foregoing embodiment are determined by pre-arrangement between the communication nodes that interact with each other; or, values of the integers Xj, Yj, p, q involved in the foregoing embodiment are determined by the communication node based on the number of the first dimension ports and/or the number of second dimension ports in the antenna port array.

In addition, the preset manner involved in the embodiment is preferably a linear weighting function. Based on this, the parameter information involved in the embodiment is the amplitude coefficient and the phase coefficient of the linear weighting function.

In an optional implementation of this embodiment, the amplitude coefficient and the phase coefficient are obtained by the communication node from the set of amplitude coefficients and the set of phase coefficients; wherein the set of amplitude coefficients and the set of phase coefficients are previously defined by the communication node, or configured by the communication node through higher layer signaling and/or physical layer signaling; or the amplitude coefficient and the phase coefficient are obtained by the communication node through channel information.

Through the description of the above embodiments, those skilled in the art can clearly understand that the method according to the above embodiment can be implemented by means of software plus a necessary general hardware platform, and of course, by hardware, but in many cases, the former is a better implementation. Based on such understanding, the essential part of the technical solution of the present disclosure or the part contributing over the prior art, may be embodied in the form of a software product stored in a storage medium (such as a ROM/RAM, a disk, an optical disc) including a number of instructions to cause a terminal device (which may be a cell phone, a computer, a server, or a network device, etc.) to perform the methods described in various embodiments of the present disclosure.

Second Embodiment

In the present embodiment, a device for feeding back channel state information is provided, which is used to implement the above-mentioned embodiment and preferred implementations. Description which has been made will not be repeated. As used below, the term "module" may implement a combination of software and/or hardware of a predetermined function. Although the devices described in the following embodiments are preferably implemented in software, hardware, or a combination of software and hardware is also possible and contemplated.

Figure 2:
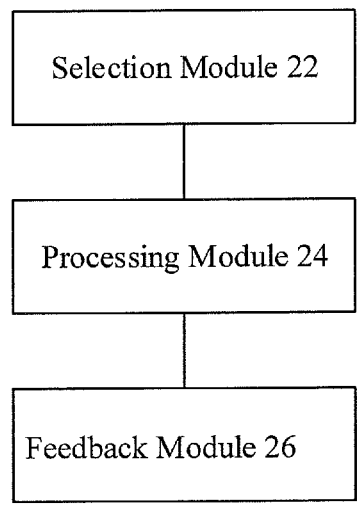
FIG. 2 is a structural block diagram of a device for feeding back channel state information according to an embodiment of the present disclosure.

FIG. 2 is a structural block diagram of a device for feeding back channel state information according to an embodiment of the present disclosure. As shown in FIG. 2, the device is applied to a communication node side, and the device includes: a selection module 22 configured to be configured select N information groups from configured M information groups; wherein N and M are positive integers, and N is less than or equal to M; a processing module 24 coupled to the selection module 22, and configured to process the selected N information groups in a preset manner to obtain index information of the N information groups and parameter information of the preset manner, wherein the index information includes: group indices of the N information groups or index of information in the N information groups; and a feedback module 26 coupled to the processing module 24, and configured to feed back the index information and the parameter information.

Optionally, the communication node involved in this embodiment includes a first communication node and a second communication node, wherein the first communication node and the second communication node have data interaction with each other. The information group involved in this embodiment includes: a codeword group and a measurement resource group; wherein the codeword group includes codewords in a codebook, and the measurement resource group includes: a measurement pilot port group, and a measurement pilot resource group.

Optionally, the device in this embodiment further includes: a configuration module, coupled to the selection module 22, and configured to configure the M information groups with configuration information.

The present embodiment will be described in detail below with reference to an optional implementation of this embodiment.

First Optional Implementation

When the information group is a codeword group, the configuration module applies to the first communication node side, and the configuration module includes:

a first acquiring unit configured to acquire a first dimension index i11 in a first codebook and a second dimension index i12 in the first codebook; and a first constructing unit coupled to the first acquiring unit and configured to construct a third dimension index of the codeword in each codeword group in the first codebook as i11+Xj, and a fourth dimension index of the codeword in each codeword group in the first codebook as i12+Yj, where i11, i12, Xj and Yj are integers.

Second Optional Implementation

When the information group is a codeword group, the codewords in the codeword group configured by the configuration module are orthogonal to each other. Based on this, the configuration module includes:

a second acquiring unit, configured to acquire the first dimension index i11 in the first codebook and the second dimension index i12 in the first codebook;

a second constructing unit coupled to the second acquiring unit, and configured to construct the first dimension index of a codeword in each codeword group in the first codebook as i11+p*O1, and the second dimension index of a codeword in each codeword group in the first codebook as i12+q*O2;

where p and q are integers, and O1 and O2 are oversampling factors of the first dimension and the second dimension, respectively.

Third Optional Implementation

When the information group is a measurement resource group, the configuration module is applied to the second communication node side, and the configuration module includes:

a third acquiring unit, configured to acquire a first dimension index i11 in a first codebook and a second dimension index i12 in the first codebook; and an agreement unit coupled to the third acquiring unit, and configured to pre-agree with the first communication node, the first dimension index of the precoding codeword in the first codebook used by the measurement resource group to be i11+p*O1, and the second dimension index in the first codebook to be i12+q*O2, where p and q are integers, and O1 and O2 are oversampling factors of the first dimension and the second dimension, respectively.

It should be noted that, in an optional implementation of this embodiment, the values of the integers Xj, Yj, p and q mentioned above are determined by pre-arrangement between the communication nodes that interact with each other; or, values of the integers Xj, Yj, p and q mentioned above are determined by the communication node based on the number of the first dimension ports and/or the number of second dimension ports in the antenna port array.

In another optional implementation of this embodiment, the preset manner involved in this embodiment is a linear weighting function; and the parameter information is an amplitude coefficient and a phase coefficient of the linear weighting function.

Optionally, the device further includes: a first acquiring module, configured to obtain an amplitude coefficient and a phase coefficient from the amplitude coefficient set and the phase coefficient set; wherein the amplitude coefficient set and the phase coefficient set are predefined by the communication node, or configured by the communication node through higher layer signaling and/or physical layer signaling; and a second acquiring module coupled to the first acquiring module and configured to obtained an amplitude coefficient and a phase coefficient through channel information.

Optionally, when the feedback module is set at the first communication node side, the feedback module feeds back the index information and the parameter information to the second communication node; or, when the feedback module is set at the second communication node side, the feedback module feeds back the index information and the parameter information to the first communication node.

It should be noted that each of the above modules may be implemented by software or hardware. For the latter, the foregoing may be implemented by, but not limited to, the foregoing modules are all located in the same processor; or, the above modules are located in different processors in any combination.

Hereinafter, the first and second embodiments of the present embodiment will be described in detail with reference to a third embodiment to a seventh embodiment.

Third Embodiment

In the LTE/LTE-A system, the base station configures the feedback type is Class A. At this time, the information group refers to the codeword group constructed by the codewords in the codebook. The terminal calculates an optimal codeword W according to the current channel information, and further acquires a first dimension index $i_{11}$ and a second dimension index $i_{12}$ of the codeword. For convenience of description, the i-th codeword of the j-th codeword group is denoted as GjCi, and the codeword of the first dimension index x and the second dimension index y is denoted as GjCi(x, y), where i and j is a positive integer and $1<=j<=M$, $1<=1<=K_m$.

In the process of communication between the base station and the terminal, the base station and the terminal always agree that N=1, M=2 and $K_m$=2, and pre-define the set of amplitude coefficients S1={0, ¼, ½, 1}, the set of phase coefficients S2={1, −1, j, −j}. Then, the terminal constructs 2 codeword groups according to the configuration information of the information group, and selects 1 codeword group therefrom, and each codeword group contains 2 codewords.

The configuration information agreed between the base station and the terminal is: (pk, qk) (k=1, 2) in each codeword group constructed is:

first group: (p1, q1)=(0, 0), (p2, q2)=(1, 0); and
second group: (p1, q1)=(0, 0), (p2, q2)=(0, 1).

The terminal calculates an optimal codeword W according to the current channel information, and further acquires a first dimension index $i_{11}$ and a second dimension index $i_{12}$ of the codeword. Further, the terminal constructs a codeword group according to the pre-agreed configuration information:

first group G1: G1C1 ($i_{11}$, $i_{12}$), G1C1 ($i_{11}$+1, $i_{12}$); and
second group G2: G2C1 ($i_{11}$, $i_{12}$), G2C2 ($i_{11}$, $i_{12}$+1).

The terminal constructs a new codeword by using two codewords in each codeword group, which are denoted as NC1 and NC2, wherein $$NC1 = G1C1(i_{11},i_{12}) + \alpha_1 e^{j\theta_1} G1C2(i_{11}+i_{12}) \text{ and}$$

$$NC2 = G2C1(i_{11},i_{12}) + \alpha_2 e^{j\theta_2} G2C2(i_{11},i_{12}+1)$$

Where $\alpha_k \in S1$, $\theta_k \in S2$, k is a positive integer and $1<=k<=M$. The terminal again uses the channel state information to traverse all possible CQIs of NC1 and NC2, so that an optimal codeword can be obtained, and the optimal codeword group of the two codeword groups can also be obtained. Then, the terminal feeds back, through the PUSCH, the group index of the codeword group, an index of the corresponding amplitude coefficient in the amplitude coefficient set and an index of the corresponding phase coefficient in the phase coefficient set.

The fourth to the seventh embodiments are described below.

Fourth Embodiment

In the LTE/LTE-A system, the base station configures the feedback type is Class A. At this time, the information group refers to the codeword group constructed by the codewords in the codebook. The terminal calculates an optimal codeword W according to the current channel information, and further acquires a first dimension index $i_{11}$ and a second dimension index $i_{12}$ of the codeword. For convenience of description, the i-th codeword of the j-th codeword group is denoted as GjCi, and the codeword of the first dimension index x and the second dimension index y is denoted as GjCi(x, y), where i and j is a positive integer and $1<=j<=M$, $1<=i<=K_m$.

In the process of communication between the base station and the terminal, the base station and the terminal always agree that N=1 and M=3. The base station notifies the terminal that $K_m$=3 through signaling, and pre-define the set of amplitude coefficients S1={0,1/4,1/2,1}, the set of phase coefficients S2={1,−1, j, −j}. Then, the terminal constructs 3 codeword groups according to the configuration information of the information group, and selects 1 codeword group therefrom, and each codeword group contains 3 codewords.

The configuration information agreed between the base station and the terminal is that the codewords included in each codeword group must be orthogonal to each other, and the (pk, qk) (k=1, 2, 3) in each codeword group constructed has a value as follows:

first group: (p1, q1)=(0, 0), (p2, q2)=(1, 0), (p3, q3)=(2, 0);
second group: (p1, q1)=(0, 0), (p2, q2)=(0, 1), (p3, q3)=(0, 2); and
third group: (p1, q1)=(0, 0), (p2, q2)=(1, 0), (p3, q3)=(0, 1).

The terminal calculates an optimal codeword W according to the current channel information, and further obtains a first dimension index $i_{11}$ and a second dimension index $i_{12}$ of the codeword. Further, the terminal constructs a codeword group according to the pre-agreed configuration information:

first group G1: G1C1 ($i_{11}$, $i_{12}$), G1C2 ($i_{11}$+$O_1$, $i_{12}$), G1C3 ($i_{11}$+$2O_1$, $i_{12}$)
second group G2: G2C1 ($i_{11}$, $i_{12}$), G2C2 ($i_{11}$, $i_{12}$+$O_2$), G2C3 ($i_{11}$, $i_{12}$+$2O_2$)
third group G3: G3C1 ($i_{11}$, $i_{12}$), G3C2 ($i_{11}$+$O_1$, $i_{12}$), G3C3 ($i_{11}$, $i_{12}$+$O_2$).

The terminal constructs a new codeword using three codewords in each codeword group, which are denoted as NC1, NC2 and NC3, wherein $$NC1 = G1C1(i_{11},i_{12}) + \alpha_1 e^{j\theta_1} \cdot G1C2(i_{11}+O_1,i_{12}) + \beta_1 e^{j\varphi_1} \cdot G1C3(i_{11}+2O_1,i_{12})$$

$$NC2 = G2C1(i_{11}, i_{12}) + \alpha_2 e^{j\theta_2} \cdot G2C2(i_{11}, i_{12}+O_2) + \beta_1 e^{j\varphi_2} \cdot G2C3(i_{11}, i_{12}+2O_2), \text{ and}$$

$$NC3 = G3C1(i_{11}, i_{12}) + \alpha_3 e^{j\theta_3} \cdot G3C2(i_{11}+O_1, i_{12}) + \beta_3 e^{j\varphi_2} \cdot G3C3(i_{11}, i_{12}+O_2)$$

where $\alpha_k \in S1$, $\theta_k \in S2$, $\beta_k \in S1$, $\varphi_k \in S2$, k is a positive integer and $1 \leq k \leq M$. The terminal again uses the channel state information to traverse all possible CQIs of NC1, NC2 and NC3, so that an optimal codeword can be obtained. Thereby, an optimal codeword can be obtained from the three codewords NC1, NC2 and NC3, and the optimal codeword group of the three codeword groups can also be obtained. Then, the terminal feeds back the group index of the codeword group through the PUCCH, and feeds back an index of the corresponding amplitude coefficient in the amplitude coefficient set and an index of the corresponding phase coefficient in the phase coefficient set through the PUSCH.

Fifth Embodiment

In the LTE/LTE-A system, the base station configures the feedback type is Class A. At this time, the information group refers to the codeword group constructed by the codewords in the codebook. The base station sends the parameters: a number N1 of the first dimension antenna ports, a number N2 of the second dimension antenna ports, a first dimension oversampling factor O1, and a second dimension oversampling factor O2 through RRC signaling. The base station and the terminal always agree that M=4, N=1 and $K_m$=4.

The base station determines the configuration information according to N1 and N2 as follows: the codewords included in each codeword group constructed are orthogonal to each other, and M=4 codewords in each codeword group ($p_k$, $q_k$) ($1 \leq k \leq M$) are combined as:

when (N1, N2)=(4, 4):
first group: (p1, q1)=(0, 0), (p2, q2)=(1, 0), (p3, q3)=(0, 1), (p4, q4)=(3, 0),
second group: (p1, q1)=(0, 0), (p2, q2)=(1, 0), (p3, q3)=(3, 0), (p4, q4)=(0, 3),
third group: (p1, q1)=(0, 0), (p2, q2)=(1, 0), (p3, q3)=(0, 1), (p4, q4)=(0, 3), and
fourth group: (p1, q1)=(0, 0), (p2, q2)=(3, 0), (p3, q3)=(0, 3), (p4, q4)=(0, 1);
when (N1, N2)=(8, 2),
first group: (p1, q1)=(0, 0), (p2, q2)=(1, 0), (p3, q3)=(0, 1), (p4, q4)=(2, 0),
second group: (p1, q1)=(0, 0), (p2, q2)=(1, 0), (p3, q3)=(2, 0), (p4, q4)=(7, 0),
third group: (p1, q1)=(0, 0), (p2, q2)=(1, 0), (p3, q3)=(0, 1), (p4, q4)=(7, 0), and
fourth group: (p1, q1)=(0, 0), (p2, q2)=(2, 0), (p3, q3)=(7, 0), (p4, q4)=(0, 1).

Taking (N1, N2)=(4, 4) as an example, the terminal, upon receiving the RRC signaling, can obtain the number of the first dimension antenna ports N1=4, the number of the second dimension antenna ports N2=4, the first dimension oversampling factor O1, and the second dimension oversampling factor O2 of the base station. The terminal can also determine the configuration information after the terminal knows N1 and N2. The terminal calculates an optimal codeword W according to the current channel information, and further acquires a first dimension index $i_{11}$ and a second dimension index $i_{12}$ of the codeword. For convenience of description, the i-th codeword of the j-th codeword group is denoted as GjCi, and the codeword of the first dimension index x and the second dimension index y is denoted as GjCi(x, y), where i and j are positive integers and $1 \leq j \leq M$, $1 \leq i \leq K_m$.

The terminal constructs 4 codeword groups according to the configuration information, each codeword group contains 4 codewords, and the codeword in each codeword group has the form $GjCi(i_{11}+pO_1, i_{12}+qO_2)$, where the value of (p, q) is determined according to the configuration information, that is, the constructed codeword groups are respectively:

first group: G1C1 ($i_{11}$, $i_{12}$), G1C2 ($i_{11}+O_1$, $i_{12}$), G1C3 ($i_{11}$, $i_{12}+O_2$), G1C4 ($i_{11}+3O_1$, $i_{12}$),
second group: G2C1 ($i_{11}$, $i_{12}$), G2C2 ($i_{11}$, $i_{12}+O_2$), G2C3 ($i_{11}+3O_1$, $i_{12}$), G2C4 ($i_{11}$, $i_{12}+3O_2$),
third group: G3C1 ($i_{11}$, $i_{12}$), G3C2 ($i_{11}+O_1$, $i_{12}$), G3C3 ($i_{11}$, $i_{12}+O_2$), G3C4 ($i_{11}$, $i_{12}+3O_2$), and
fourth group: G4C1 ($i_{11}$, $i_{12}$), G4C2 ($i_{11}$, $i_{12}+3O_2$), G4C3 ($i_{11}+3O_1$, $i_{12}$), G4C4 ($i_{11}$, $i_{12}+O_2$)

The terminal constructs a new codeword using the 4 codewords in each codeword group, which are denoted as NC1, NC2, NC3 and NC4, $$NC1 = G1C1(i_{11}, i_{12}) + \alpha_1 e^{j\theta_1} G1C2(i_{11}+O_1, i_{12}) + \alpha_2 e^{j\theta_2} G1C3(i_{11}, i_{12}+O_2) + \alpha_3 e^{j\theta_2} G1C4(i_{11}+3O_1, i_{12})$$

$$NC2 = G2C1(i_{11}, i_{12}) + \alpha_1 e^{j\theta_1} G2C2(i_{11}+O_1, i_{12}) + \alpha_2 e^{j\theta_2} G2C3(i_{11}, i_{12}+O_2) + \alpha_3 e^{j\theta_3} G2C4(i_{11}+3O_1, i_{12})$$

$$NC3 = G3C1(i_{11}, i_{12}) + \alpha_1 e^{j\theta_1} G3C2(i_{11}+O_1, i_{12}) + \alpha_2 e^{j\theta_2} G3C3(i_{11}, i_{12}+O_2) + \alpha_3 e^{j\theta_2} G3C4(i_{11}+3O_1, i_{12})$$

$$NC4 = G4C1(i_{11}, i_{12}) + \alpha_1 e^{j\theta_1} G4C2(i_{11}+O_1, i_{12}) + \alpha_2 e^{j\theta_2} G4C3(i_{11}, i_{12}+O_2) + \alpha_3 e^{j\theta_3} G1C4(i_{11}+3O_1, i_{12})$$

where $\alpha_k$, $\theta_k$ are real numbers, k is a positive integer and $1 \leq k \leq 3$. Let H be the current channel matrix, and the vector RV be the right singular vector of the matrix $H^H H$. Then $\alpha_k$, $\theta_k$ can be calculated by the following formula:

$$(\alpha_k, \beta_k) = \underset{\alpha_k, \beta_k}{\operatorname{argmin}} \|RV - NC1\|^2.$$

The terminal again uses the channel state information to traverse the channel quality indication CQIs corresponding to NC1, NC2, NC3 and NC4, so that an optimal codeword can be obtained, thereby obtaining the optimal codeword group of the 4 codeword groups. Then, the terminal feeds back the group index of the codeword group and the corresponding coefficients $\alpha_k$, $\theta_k$ through the PUCCH and/or the PUSCH.

Sixth Embodiment

In the LTE/LTE-A system, the base station configures the feedback type is Class A. At this time, the information group refers to the codeword group constructed by the codewords in the codebook. The terminal calculates an optimal codeword W according to the current channel information, and further acquires a first dimension index $i_{11}$ and a second dimension index $i_{12}$ of the codeword. For convenience of description, the i-th codeword of the j-th codeword group is denoted as GjCi, and the codeword of the first dimension index x and the second dimension index y is denoted as GjCi(x, y), where i and j is a positive integer and $1 \leq j \leq M$, $1 \leq i \leq K_m$.

The terminal can know that M=1 and N=1 through the agreement with the base station. The terminal receives the physical layer signaling to know that the value of $K_m$ is 3. Thus, the terminal will construct 1 codeword group with the configuration information of the information group, and select 1 codeword group therefrom, each codeword group containing 3 codewords.

The base station and the terminal agree that the codeword group includes the codeword GjCi ($i_{11}$, $i_{12}$), and the $K_{in}-1$ codewords that match the current channel information best other than the codeword GjCi (i11, i12) in the codebook constitute a codeword group. The terminal constructs a new codeword with three codewords in the codeword group, which is denoted as NC1, wherein $$NC1 = G1C1(i_{11},i_{12}) + \alpha_1 e^{j\theta_1} G1C2(u_1,v_1) + \beta_1 e^{j\varphi_1} G1C3(u_2,v_2)$$

where $\alpha_k$, $\theta_k$ are real numbers, k is a positive integer and $1<=k<=M$, u1, v1, u2, v2 represent indices of the first or second dimension of the codewords G1C2 and G1C3. Let H be the current channel matrix, and the vector RV be the right singular vector of the matrix $H^H H$. Then $\alpha_k$, $\theta_k$ can be calculated by the following formula:

$$(\alpha_k, \beta_k) = \underset{\alpha_k, \beta_k}{\mathrm{argmin}} \|RV - NC1\|^2.$$

After calculating the optimal amplitude coefficient and the phase coefficient, the terminal feeds back, through the PUSCH channel, the index of the phase coefficient used for constructing the new codeword of the codeword group, and feeds back, through the PUCCH channel, the index of the amplitude coefficient used for constructing the new codeword of the codeword group.

Seventh Embodiment

The base station configures the feedback type is Class B, and the number of pre-coding CSI-RS ports is 4. The 4 CSI-RS ports may be 4 ports on the same set of CSI-RS resources, or may be from different CSI-RS resources. The base station determines a first dimension index $i_{11}$ and a second dimension index $i_{12}$ of the precoding codeword used by the CSI-RS. In the process of communication between the base station and the terminal, the base station and the terminal always agree that M=2, N=1 and $K_m$=2, and pre-define the set of amplitude coefficients S1={0, ¼, ½, 1}, and the set of phase coefficients S2={1,-1, j, -j}.

The configuration information agreed by the base station and the terminal is: the precoding codewords used by the precoding CSI-RS of the base station are orthogonal; after the first dimension information i11 in the first codebook of the base station and the second dimension information i12 in the first codebook are obtained, combination of the ($p_k$, $q_k$) ($1<=k<=M$) of the precoding codeword matrix used by the CSI-RS is:

first group: (p1, q1)=(0, 0), (p2, q2)=(0, 1), and
second group: (p1, q1)=(0, 0), (p2, q2)=(1, 0).

Thus, the base station constructs M=2 CSI-RS port groups: the base station performs precoding for two CSI-RS ports of the first group of CSI-RS ports respectively with codewords G1C1 (i11, i12) and G1C2 (i11, i12+O2), and performs precoding for two CSI-RS ports of the second group of CSI-RS ports respectively with codewords G2C1 (i11, i12) and G2C2 (i11+O1, i12).

The terminal can know that M=2, N=1 and $K_m$=2 through the agreement with the base station. Thus, the terminal learns that the base station constructs two precoding port groups. The terminal does not actually know the codeword information used by the base station for precoding the CSI-RS ports. That is, the terminal does not know the codeword information used by the 4 CSI-RS ports of the base station, and the terminal can only know information of $H_1 \cdot G1C1(i_{11}, i_{12})$, $H_2 \cdot G1C2(i_{11}+O_1, i_{12})$, $H_3 \cdot G2C1(i_{11}, i_{12})$ and $H_4 \cdot G2C2(i_{11}, i_{12}+O_2)$, where $H_1$, $H_2$, $H_3$, $H_4$ are 4 CSI-RS Channel information corresponding to the 4 CSI-RS ports. The terminal constructs a new codeword using the selected precoding CSI-RS port as:

$$NC1 = H_1 \cdot G1C1(i_{11},i_{12}) + \alpha_1 e^{j\theta_1} H_2 \cdot G1C2(i_{11}+O_1,i_{12}),$$
and
$$NC2 = H_3 \cdot G2C1(i_{11},i_{12}) + \alpha_2 e^{j\theta_2} H_4 \cdot G2C2(i_{11},i_{12}+O_2).$$

The terminal uses the channel state information to calculate a set of optimal amplitude coefficients $\alpha_k$ and phase coefficients $\theta_k$, $\alpha_k \in S1$, $\theta_k \in S2$, where $1<=k<=2$. At the same time, the terminal feeds back the selected precoding CSI-RS port information and the corresponding weighting coefficient through the PUSCH channel.

An embodiment of the present disclosure also provides a storage medium. Optionally, in the embodiment, the foregoing storage medium may be configured to store program codes for performing the following steps:

S1: selecting N information groups from the configured M information groups; where N and M are positive integers, and N is less than or equal to M;

S2: processing the selected N information groups in a preset manner to obtain index information of the N information groups and parameter information of the preset manner, wherein the index information includes: group indices of the N information groups or index of information in the N information groups; and S3: feeding back the index information and the parameter information.

Optionally, in this embodiment, the foregoing storage medium may include, but not limited to, various media that can store program codes such as a USB flash drive, a Read-Only Memory (ROM), a Random Access Memory (RAM), a mobile hard disk, a magnetic disk, and an optical disk.

For example, the specific examples in this embodiment may refer to the examples described in the foregoing embodiments and the optional embodiments, and details are not described herein again.

It will be apparent to those skilled in the art that the various modules or steps of the present disclosure described above can be implemented by a general-purpose computing device that can be centralized on a single computing device or distributed across a network of multiple computing devices. Alternatively, they may be implemented by program codes executable by the computing device. Therefore, they can be stored in a storage device and executed by the computing device, and in some cases, the steps shown or described may be performed in an order different from that herein. Alternatively, they may be fabricated into individual integrated circuit modules, or a plurality of modules or steps may be fabricated into a single integrated circuit module. Thus, the present disclosure is not limited to any specific combination of hardware and software.

The above description is only preferred embodiments of the present disclosure, and is not intended to limit the present disclosure, and various modifications and changes can be made to the present disclosure by those skilled in the art. Any modifications, equivalent substitutions, improvements, etc. made within the spirit and scope of the present disclosure are intended to be included within the scope of the present disclosure.

INDUSTRIAL APPLICABILITY

With the embodiment of the present disclosure, the communication node may feed back to other communication nodes the group indices of a plurality of selected information groups or indices of the information in the plurality of information groups, and parameter information of the reset manner for processing the information groups. That is, the communication node can process the plurality of information groups in the channel, not only limited to the information group having the strongest path information. Therefore, it can solve the problem in the related art that a precoding matrix or a selected beam are fed back based on the strongest path information in the channel, and can achieve an effect of improving resource utilization.

What is claimed is:

1. A method for feeding back channel state information, comprising:
    constructing, by a communication node, M first information groups, according to a first codeword W and a pre-agreed configuration information, M being a positive integer;
    wherein the first codeword W is calculated from a codebook according to the channel state information; and
    each first information group of the M first information groups comprises a plurality of second codewords, and the plurality of second codewords are obtained according to the codebook, the pre-agreed configuration information and obtained index information of the first codeword W;
    constructing, by the communication node, N second information groups from the constructed M first information groups in a preset manner; where N is a positive integer, and N is less than or equal to M;
    determining, by the communication node, an third information group from the constructed N second information groups, index information of the third information group, and parameter information of the preset manner corresponding to the third information group, based on the channel state information;
    wherein the index information of the third information group comprises group indices of the third information group, and the parameter information comprises an index of a parameter of the preset manner corresponding to the third information group; and
    feeding back, by the communication node, the index information of the third information group and the parameter information.

2. The method according to claim 1, wherein constructing, by the communication node, the M first information groups according to the first codeword W and the pre-agreed configuration information, comprises:
    acquiring, by the communication node, a first dimension index $i_{11}$ of the first codeword W in the codebook and a second dimension index $i_{12}$ of the first codeword W in the codebook; and
    constructing, by the communication node, a first dimension index in the codebook of a second codeword in the first information group as $i_{11}+X_j$ and a second dimension index in the codebook of the second codeword in the first information group as $i_{12}+Y_j$,
    wherein $i_{11}$, $i_{12}$, $X_j$ and $Y_j$ are integers.

3. The method according to claim 2, wherein the plurality of second codewords in the first information group configured according to the pre-agreed configuration information are orthogonal to each other.

4. The method according to claim 2, wherein values of the integers $X_j$ and $Y_j$ are determined by pre-arrangement between communication nodes.

5. The method according to claim 1, wherein configuring, by the communication node, the M first information groups according to the first codeword W and the pre-agreed configuration information, comprise:
    acquiring, by the communication node, a first dimension index $i_{11}$ of the first codeword W in the codebook and a second dimension index $i_{12}$ of the first codeword W in the codebook; and
    constructing, by the communication node, a first dimension index in the codebook of a second codeword in the first information group as $i_{11}+p*O1$, and a second dimension index in the codebook of the second codeword in the first information as $i_{12}+q*O2$,
    where p and q are integers, and O1 and O2 are oversampling factors of the first dimension and the second dimension, respectively.

6. The method according to claim 5, wherein values of the integers p and q are determined by pre-arrangement between communication nodes.

7. The method according to claim 1, wherein the preset manner is a linear weighting function; and the parameter comprises an amplitude coefficient of the linear weighting function and a phase coefficient of the linear weighting function.

8. The method of claim 7, wherein the amplitude coefficient and the phase coefficient are obtained by the communication node, from a set of amplitude coefficients and a set of phase coefficients, respectively;
    wherein the set of amplitude coefficients and the set of phase coefficients are previously defined by the communication node, or
    configured by the communication node through higher layer signaling and/or physical layer signaling; or
    the amplitude coefficient and the phase coefficient are obtained by the communication node through channel information.

9. A device for feeding back channel state information, which is applied to a communication node side, comprising:
    a processor; and
    a memory for storing instructions executable by the processor;
    wherein the processor is configured to:
    construct M first information groups, according to a first codeword W and a pre-agreed configuration information, M being a positive integer;
    wherein the first codeword W s calculated from a codebook according to the channel state information; and
    each first information group of the M first information groups comprises a plurality of second codewords, and the plurality of second codewords are obtained according to the codebook, the pre-agreed configuration information and obtained index information of the first codeword W;
    construct N second information groups from the constructed M first information groups in a preset manner; where N is a positive integer, and N is less than or equal to M;
    determine a third information group from the constructed N second information groups, index information of the third information group, and parameter information of the preset manner corresponding to the third information group; based on the channel state information;

wherein the index information of the third information group comprises group indices of the third information group, and the parameter information comprises an index of a parameter of the preset manner corresponding to the third information group; and feed back the index information of the third information group and the parameter information.

10. The device according to claim 9, wherein the processor is configured to:

acquire a first dimension index $i_{11}$ of the first codeword W in the codebook and a second dimension index $i_{12}$ of the first codeword W in the codebook; and construct a first dimension index in the codebook of a second codeword in the first information group as $i_{11}+X_j$, and a second dimension index in the codebook of the second codeword in the first information group as $i_{12}+Y_j$, where $i_{11}$, $i_{12}$, $X_j$ and $Y_j$ are integers.

11. The device according to claim 10, wherein the plurality of second codewords in the first information group configured according to the pre-agreed configuration module are orthogonal to each other.

12. The device according to claim 10, wherein values of the integers $X_j$ and $Y_j$ are determined by pre-arrangement between communication nodes.

13. The device according to claim 9, wherein the processor is configured to:

acquire a first dimension index of the first codeword W in the codebook and a second dimension index $i_{12}$ of the first codeword W in the codebook; and construct a first dimension index in the codebook of a second codeword in the first information group as $i_{11}+p*O1$, and a second dimension index in the codebook of the second codeword in the first information group as $i_{12}+q*O2$, where p and q are integers, and O1 and O2 are oversampling factors of the first dimension and the second dimension, respectively.

14. The device according to claim 13, wherein values of the integers p and q are determined by pre-arrangement between communication nodes.

15. The device according to claim 9, wherein the preset manner is a linear weighting function; and the parameter comprise an amplitude coefficient of the linear weighting function and a phase coefficient of the linear weighting function.

16. The device according to claim 15, wherein the processor is further configured to:

acquire the amplitude coefficient and the phase coefficient from a set of amplitude coefficients and a set of phase coefficients, respectively;

wherein the set of amplitude coefficients and the set of phase coefficients are previously defined by the communication node, or configured by the communication node through higher layer signaling and/or physical layer signaling; or acquire an amplitude coefficient and a phase coefficient through channel information.

\* \* \* \* \*